(12) United States Patent
Botte et al.

(10) Patent No.: US 10,738,387 B2
(45) Date of Patent: Aug. 11, 2020

(54) ELECTROCHEMICAL CELL CONTAINING A GRAPHENE COATED ELECTRODE

(71) Applicant: Ohio University, Athens, OH (US)

(72) Inventors: Gerardine G. Botte, Athens, OH (US); Santosh Vijapur, Beavercreek, OH (US)

(73) Assignee: Ohio University, Athens, OH (US)

( * ) Notice: Subject to any disclaimer, the term of this patent is extended or adjusted under 35 U.S.C. 154(b) by 1038 days.

(21) Appl. No.: 15/031,458

(22) PCT Filed: Oct. 27, 2014

(86) PCT No.: PCT/US2014/062392
§ 371 (c)(1),
(2) Date: Apr. 22, 2016

(87) PCT Pub. No.: WO2015/108596
PCT Pub. Date: Jul. 23, 2015

(65) Prior Publication Data
US 2016/0251765 A1    Sep. 1, 2016

Related U.S. Application Data

(60) Provisional application No. 61/895,639, filed on Oct. 25, 2013.

(51) Int. Cl.
*C25B 11/04* (2006.01)
*C25B 1/00* (2006.01)
(Continued)

(52) U.S. Cl.
CPC ........ *C25B 11/0478* (2013.01); *C01B 32/186* (2017.08); *C01C 1/086* (2013.01);
(Continued)

(58) Field of Classification Search
CPC ..... C25B 11/00; C25B 11/12; C25B 11/0442; C25B 11/0447; C25B 11/0478;
(Continued)

(56) References Cited

U.S. PATENT DOCUMENTS

| 7,485,211 B2 | 2/2009 | Botte et al. |
| 7,736,475 B2 | 6/2010 | Sandoval et al. |

(Continued)

FOREIGN PATENT DOCUMENTS

WO    2013154997 A1    10/2013

OTHER PUBLICATIONS

Wang et al., Coal Char Derived Few-Layer Graphene Anodes for Lithium Ion Batteries, 2014, Photonics, 1, 251-259.*

(Continued)

*Primary Examiner* — Arun S Phasge
(74) *Attorney, Agent, or Firm* — Wood Herron & Evans LLP

(57) ABSTRACT

An electrochemical cell 10 is provided that includes first and second electrodes 13, 15, an electrolyte medium 17 in electrolytic communication with the first and second electrodes 13, 15, a chemical substance capable of undergoing an electrochemical reaction, and a voltage source 19 in electrolytic communication with the first and second electrodes 13, 15. The first electrode 13 includes a layer of an active catalyst material 25, and graphene coating 27 at least partially covering the layer of the active catalyst material 25. Methods for making and using the graphene coated electrode are further provided.

4 Claims, 9 Drawing Sheets

(51) Int. Cl.
*C25B 3/02* (2006.01)
*C01B 32/186* (2017.01)
*C01C 1/08* (2006.01)
*C25B 9/06* (2006.01)

(52) U.S. Cl.
CPC .................. *C25B 1/00* (2013.01); *C25B 3/02* (2013.01); *C25B 9/06* (2013.01)

(58) Field of Classification Search
CPC ... C25B 11/0484; C25B 11/0489; C25B 1/00; C25B 9/06
See application file for complete search history.

(56) References Cited

U.S. PATENT DOCUMENTS

| | | |
|---|---|---|
| 7,803,264 B2 | 9/2010 | Botte |
| 7,988,941 B2 | 8/2011 | Choi et al. |
| 8,029,759 B2 | 10/2011 | Botte |
| 8,216,437 B2 | 7/2012 | Botte |
| 8,216,956 B2 | 7/2012 | Botte |
| 8,221,610 B2 | 7/2012 | Botte |
| 8,303,781 B2 | 11/2012 | Botte |
| 8,388,920 B2 | 3/2013 | Botte |
| 8,486,256 B2 | 7/2013 | Botte et al. |
| 8,562,929 B2 | 10/2013 | Botte |
| 8,668,814 B2 * | 3/2014 | McAlister ............... F24S 20/20 204/272 |
| 2005/0211569 A1 | 9/2005 | Botte et al. |
| 2007/0053168 A1 | 3/2007 | Sayir et al. |
| 2008/0314755 A1 | 12/2008 | Botte |
| 2008/0318097 A1 | 12/2008 | Botte |
| 2009/0050489 A1 | 2/2009 | Botte |
| 2009/0081500 A1 | 3/2009 | Botte |
| 2009/0095636 A1 | 4/2009 | Botte |
| 2009/0127094 A1 | 5/2009 | Botte |
| 2009/0145750 A1 | 6/2009 | Botte |
| 2010/0032320 A1 | 2/2010 | Botte et al. |
| 2010/0203340 A1 | 8/2010 | Ruoff et al. |
| 2010/0247420 A1 | 9/2010 | Botte |
| 2010/0252422 A1 | 10/2010 | Botte |
| 2011/0243823 A1 | 10/2011 | Botte |
| 2011/0302909 A1 | 12/2011 | Botte |
| 2011/0315605 A1 | 12/2011 | Botte |
| 2012/0024719 A1 | 2/2012 | Botte |
| 2012/0325682 A1 | 12/2012 | Botte |
| 2013/0017443 A1 | 1/2013 | Yamazaki |
| 2013/0026029 A1 | 1/2013 | Kayaert et al. |
| 2013/0037424 A1 | 2/2013 | Botte |
| 2013/0084495 A1 | 4/2013 | Tajima et al. |
| 2013/0154997 A1 | 6/2013 | Lin et al. |
| 2013/0171517 A1 | 7/2013 | He et al. |
| 2015/0125604 A1 | 5/2015 | Botte |

OTHER PUBLICATIONS

Chen, Shanshan, et al., "Oxidation resistance of graphene-coated Cu and Cu/Ni alloy," Office of Naval Research and the DARPA Carbon Electronics for RF Applications Center, Center for Molecular Interfacing and Cornell Center for Materials Research (no date) (18 pages).

Dlubak, Bruno, et al., "Graphene-Passivated Nickel as an Oxidation-Resistant Electrode for Spintronics," ACS Nano, vol. 6, No. 12 (10930-10934), Nov. 12, 2012 (5 pages).

Klusek, Z., et al., "Local electronic edge states of graphene layer deposited on Ir (1 1 1) surface by STM/CITS," Science Direct, Applied Surface Science 252 (1221-1227), 2005 (7 pages).

Patent Cooperation Treaty, International Search Report and Written Opinion for corresponding application No. PCT/US2014/062392 dated Jul. 29, 2015 (10 pages).

Vijapur, Santosh H., et al., "Raw Coal Derived Large Area and Tranparent Graphene Films," ECS Solid State Letters, Center for Electrochemical Engineering Research (CEER), Department of Chemical and Biomolecular Engineering Department, Ohio University, Athens, OH, May 9, 2013, pp. M45-M47, vol. 2(7) (3 pages).

* cited by examiner

US 10,738,387 B2

ELECTROCHEMICAL CELL CONTAINING A GRAPHENE COATED ELECTRODE

CROSS-REFERENCE TO RELATED APPLICATIONS

This application is a National Stage Entry under 35 U.S.C. § 371 of PCT Application No. PCT/US2014/062392, filed on Oct. 27, 2014, which claims the benefit of U.S. Application No. 61/895,639, filed Oct. 25, 2013, both of which are incorporated herein by reference in their entireties.

GOVERNMENT GRANT SUPPORT CLAUSE

This invention was made with Government support under Grant Award No. W9132T-09-1-0001 awarded by the U.S. Army Construction Engineering Research Laboratory, Department of Defense. The Government has certain rights in this invention.

FIELD OF THE INVENTION

The present invention is directed to electrochemical cells for electrochemical processes, and more particularly, to electrodes having a graphene coating.

BACKGROUND OF THE INVENTION

Electrodes are used in many applications and processes including, but not limited to, sensor applications, fuel cell applications, electrolyzer applications, electrosynthesis applications, battery applications, and hydrolysis processes, for example. However, many electrodes are hampered by surface blockage of the catalyst as well as transport of the chemical species to the active catalytic surface. Ideally, high concentration of reactants at the catalyst surface is desired with fast concomitant removal of the products. Additionally, corrosion is another common problem encountered in many applications. Accordingly, improved electrodes are needed.

SUMMARY OF THE INVENTION

The present invention is premised on the realization that a graphene coating can be applied to active catalyst materials to provide an unexpectedly efficient and robust electrode, which is also more resistant to corrosion. More particularly, the present invention is premised on the realization that a graphene coating deposited on active catalyst materials causes a significant increase in the electrochemical rates of an indirect or catalyst regeneration (EC') type mechanism type reaction, and improves corrosion resistance even under mild alkaline pH environments.

In accordance with an embodiment of the present invention, an electrochemical cell is provided, the cell includes a first electrode comprising a layer of an active catalyst material, and graphene coating at least partially covering the layer of the active catalyst material; a second electrode comprising a conductor; an electrolyte medium in electrolytic communication with the first and second electrodes; a chemical substance capable of undergoing an electrochemical reaction; and a voltage source in electrolytic communication with the first and second electrodes.

In accordance with another embodiment of the present invention, a method of making the first electrode of the electrochemical cell is provided. The method includes preparing a graphene coating; and covering at least a portion of the active catalyst material with the graphene coating. The graphene coating may be prepared by heating electrolyzed coal to a temperature effective to form graphite in the presence of a flowing stream of reductant gas, wherein the stream of reductant gas deposits graphene onto a surface of a copper substrate, which is followed by dissolving the copper substrate.

In accordance with another embodiment of the present invention, a method for producing ammonia by an electrolytic hydrolysis of urea is provided. The method includes, applying a voltage difference to an electrolytic cell comprising: a first electrode comprising a layer of an active catalyst material, and graphene coating at least partially covering the layer of the active catalyst material; a second electrode comprising a conductor; an electrolyte medium in electrolytic communication with the first and second electrodes; urea; and a voltage source in electrolytic communication with the first and second electrodes. The voltage difference is applied across the first and second electrodes and is sufficient to effect the electrolytic hydrolysis of urea to produce ammonia.

In accordance with yet another embodiment, an electrode is provided that includes a layer of an active catalyst material, and a graphene coating at least partially covering the layer of the active catalyst material.

The objects and advantages of the present invention will be further appreciated in light of the following detailed description and examples in which:

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to describe the invention.

DETAILED DESCRIPTION OF EMBODIMENTS OF THE INVENTION

Unless clearly defined otherwise from the context, any range of values presented in the following Detailed Description and Claims includes each end point as well as each whole number or fractional part thereof, within the recited range. Additionally, approximating language may be applied to modify any quantitative representation that may vary without resulting in a change in the basic function to which it is related. Accordingly, a value modified by a term or terms, such as "about" and "substantially," may not be limited to the precise value specified. By way of example, a range from "about 0.1 nm to about 50 nm," includes for example, 0.1 nm, 0.2 nm, 0.5 nm, 3 nm, 3.14 nm, 49.999 nm, 50 nm, etc., and may include values slightly below 0.1 nm and slightly above 50 nm.

Figure 1:
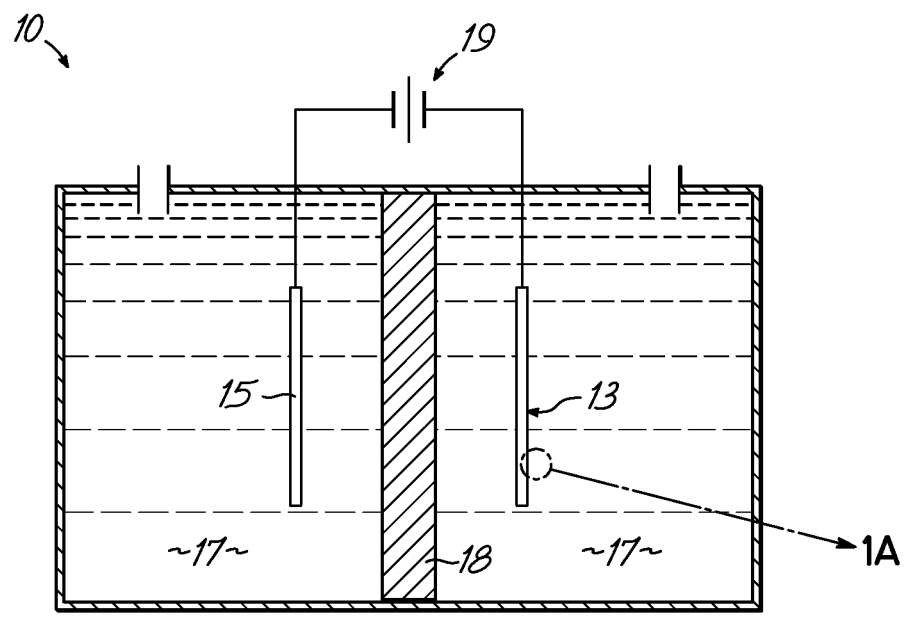
FIG. 1 is a diagrammatical view of a simplified electrochemical cell showing a graphene coated electrode, in accordance with an embodiment of the present invention.

In accordance with an embodiment of the present invention and in reference to FIG. 1, an electrochemical cell 10 is provided that includes a first electrode 13, a second electrode 15, an electrolyte medium 17 in electrolytic communication with the first and second electrodes 13, 15; a chemical substance capable of undergoing an electrochemical reaction; and a voltage source 19 in electrolytic communication with the first and second electrodes. The first and second electrodes 13, 15 may be physically separated by a separator 18. In a batch-type arrangement shown in FIG. 1, the electrolyte medium 17 may be stirred to facilitate mass transfer. It will be readily apparent to one of ordinary skill in the art that the above cell 10 is readily adaptable to a continuous flow cell configuration, semi-continuous, and with recirculation of the electrolyte medium 17.

Figure 1A:
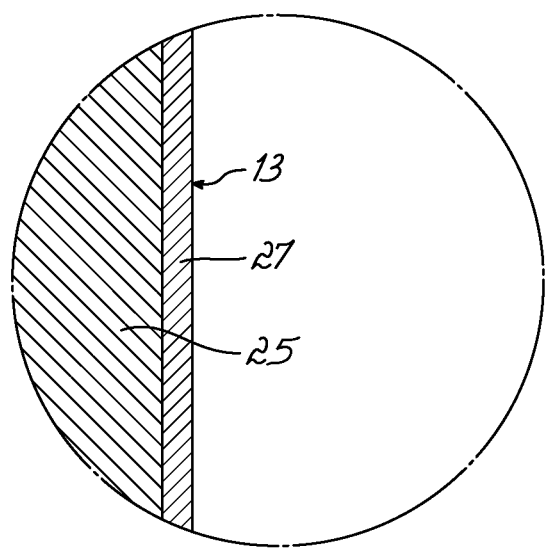
FIG. 1A is an enlarged view of the in-circle portion 1A of the graphene coated electrode shown in FIG. 1, showing in cross-section the coating material, in accordance with another embodiment of the present invention.

In accordance with embodiments of the present invention and as shown in FIG. 1A, the first electrode 13 includes a layer of an active catalyst material 25, and graphene coating 27 at least partially covering the layer of the active catalyst material. The active catalyst materials 25 are not particularly limited and may be utilized in a wide range of applications and processes. For example, the active catalyst materials 25 include, but are not limited to, catalysts suitable for oxidizing organic materials such as alcohols, amines, ammonia, and urea, for example. Exemplary active catalyst materials 25 and their respective applications include those described in U.S. Pat. Nos. 7,485,211; 7,803,264; 8,029,759; 8,216,437; 8,216,956; 8,221,610; 8,303,781; 8,388,920; 8,486,256; and 8,562,929; and U.S. Patent Application Publication Nos. 2013/0037424; 2012/0325682; 2012/0024719; 2011/0315605; 2011/0302909; 2011/0243823; 2010/0252422; 2010/0247420; 2010/0032320; 2009/0145750; 2009/0127094; 2009/0095636; 2009/0081500; 2009/0050489; 2008/0318097; 2008/0314755; 2005/0211569, each of which is incorporated by reference herein in its entirety. The active catalyst materials 25 include, but are not limited to, platinum, iridium, rhodium, rubidium, ruthenium, rhenium, palladium, gold, silver, nickel, iron, cobalt, copper, zinc, chromium, tantalum, gallium, cadmium, indium, thallium, tin, lead, bismuth, silver, mercury, niobium, vanadium, manganese, aluminum, arsenic, selenium, antimony, titanium, tungsten, Raney metal, carbon steel, stainless steel, graphite, and mixtures and alloys thereof. In one embodiment, the active catalyst material 25 comprises nickel and/or nickel oxyhydroxide. In another embodiment, the active catalyst material 25 comprises nickel, manganese, cobalt, or zinc, or combinations thereof. In another embodiment, the active catalyst material 25 comprises a metal oxyhydroxide.

The first electrode 13 may further include a support material (not shown) onto to which the active catalyst material 25 is deposited. The support material may itself be electrically conducting or integrated with a conducting component. The support material for the active catalyst material is not particularly limited and may be chosen from many known supports, including, but not limited to foils, meshes, sponges, and beads, for example. For example, the support materials may include, but are not limited to, noble metal meshes and foils, such as platinum mesh, platinum foil, gold mesh, gold foil, tantalum mesh, tantalum foil, as well as platinum or iridium sponges, a carbon support integrated with a conductive metal, nickel foils, titanium foils, graphite, carbon fibers, carbon paper, glassy carbon, carbon nanofibers, and carbon nanotubes. Aside from these specific support materials listed, other suitable supports will be recognized by those of ordinary skill in the art.

In accordance with embodiments of the present invention, the active catalyst materials 25 may be deposited on the support material to cover at least a portion of a surface of the support material. The active catalyst material 25 may be at least partially deposited on a surface of the support material by commonly used methods such as, but not limited to, electrodeposition, chemical vapor deposition (CVD), atomic layer deposition, electrospray, electroless deposition, or combinations thereof. It should be appreciated that the support material itself may be constructed entirely of the active catalyst material. Thus, a layer of an active catalyst material 25 on the support material can include a unitary construction embodiment, such as for example a nickel disk, even if the active catalyst material 25 is not specifically deposited on the support material by a separate process.

The structure of the first electrode 13 is not particularly limited to any specific shape or form. For example, the first electrode 13 may be formed as foil, wire, gauze, bead, or combinations thereof.

The graphene coating 27 on the layer of the active catalyst material 25 may be applied using standard methods. For example, a graphene layer may be prepared on a copper substrate in accordance with a method described in Patent Cooperation Treaty Published Application WO2013/154997 and U.S. Provisional Patent Application No. 61/621,625, each of which is incorporated herein by reference in its entirety, lifted from the copper substrate, and then applied to the active catalyst material 25. In an embodiment, the graphene film may be grown by chemical vapor deposition of electrolyzed coal onto a copper substrate. The electrolysis of coal and other carbon-based products such as charcoal lignites or graphite, is further described in U.S. Pat. No. 7,736,475, the disclosure of which is incorporated herein by reference.

The graphene coating 27 may be present in an effective thickness to protect the active catalyst material 25 and inhibit the active catalyst material 25 from degradation induced by one or more constituents in the working medium. For example, some active catalyst materials may be reactive with acidic media or basic media, but the graphene layer 27 may impart chemical and physical stability to the active catalyst material 25 in the acidic, caustic, or neutral media.

In accordance with an embodiment, the graphene coating 27 may be one graphene layer thick. In another embodiment, the graphene coating 27 may be comprised of multiple graphene layers. For example, the graphene coating 27 may comprise 1, 2, 3, 4, or 5 or more, graphene layers. Accordingly, the graphene coating 27 may be comprised of 1 to about 5 layers of graphene. Alternatively, the graphene coating may be comprised of about 3 to about 5 layers of graphene. Thus, "few layer graphene sheets" as used herein may be comprised of about 2 to about 5 layers of graphene. Accordingly, the graphene coating may have a thickness from about 0.1 nm to about 50 nm, or about 0.2 nm to about 25 nm, or about 1 nm to about 10 nm, or about 2 nm to about 5 nm, for example.

In one embodiment, the graphene coating 27 is present in an effective amount to inhibit the active catalyst material from adsorbing carbon monoxide. For example, in one example, an electrode comprising a glassy carbon substrate having an active catalyst material comprising nickel at least partially deposited thereon, and having a layer of graphene at least partially covering the active catalyst material did not absorb carbon monoxide. Despite the expectation that coating the active catalyst material 25 with the graphene coating 27 would render the catalyst inactive, the electrode constructed in accordance with foregoing provided an unexpected and significant increase in performance, as well as resistance to corrosion.

The second electrode 15 comprising a conductor is not particularly limited and may be selected from electrodes known in the art. For instance, the second electrode 15 may comprise, but is not limited to, platinum, palladium, carbon, rhenium, nickel, Raney Nickel, iridium, vanadium, cobalt, iron, ruthenium, molybdenum, or combinations thereof. It is within the purview of one of ordinary skill in the art to select the appropriate second electrode in view of the parameters of the particular application for which the inventive system is used. In an embodiment, the second electrode 15 may also include an active catalyst material and/or a graphene coating, as described above.

The electrolyte medium 17 can be aqueous or non aqueous and acidic, basic, or pH-neutral. In an embodiment, the electrolyte medium 17 comprises organic solvents or ionic liquids. In another embodiment, the electrolyte medium 17 is an aqueous, basic electrolyte solution. For example, an aqueous, basic electrolyte solution may comprise a hydroxide salt (e.g., KOH, NaOH), a carbonate salt (e.g., $K_2CO_3$, $Na_2CO_3$), a bicarbonate salt (e.g., $KHCO_3$, $NaHCO_3$), or combinations thereof.

The electrolyte medium 17 may have a hydroxide concentration of less than 0.1 M. For example, the pH of the electrolyte medium 17 may be in a range from about 10 to about 7. Alternatively, the electrolyte medium 17 may have a hydroxide concentration of about 0.1 M to about 5 M. In another embodiment, the electrolyte medium 17 is an aqueous, pH-neutral electrolyte solution. In yet another embodiment, the electrolyte medium 17 is an aqueous, acidic electrolyte solution.

In accordance with another embodiment, the electrolyte medium 17 includes a gel, such as a solid polymer electrolyte. Suitable gels include, but are not limited to, those containing polyacrylic acid, polyacrylates, polymethacrylates, polyacrylamides and similar polymers and copolymers.

The electrolytic gel may be prepared using any suitable method. One method includes forming a polymer and then injecting a hydroxide, a carbonate or a bicarbonate salt electrolyte into the polymer to form a polymeric mixture. In another method, the monomer may be polymerized in the presence of a hydroxide, a carbonate, or bicarbonate salt electrolyte.

The separator 18 compartmentalizes the first and second electrodes. Separators should be constructed from materials chemically resistant to the electrolyte medium 17. Many polymers are suitable for constructing separators, such as Teflon® and polypropylene. Separators are not required for simple batch-type arrangements, but may be advantageous for continuous flow electrochemical cells or fuel cells. Separators may include ion exchange membranes, solid electrolytes or the above electrolytic gels, for example. Separators may be permeable, semi-permeable or impermeable to gases or liquids.

The chemical substance capable of undergoing an electrochemical reaction is not particularly limited. For example, the chemical substance may be, but is not limited to, alcohols such as methanol and ethanol, urea, ammonia, water, and lignin. In accordance with an embodiment, the chemical substance comprises urea. One convenient source of urea is diesel exhaust fluid (DEF), commonly referred to as AdBlue in Europe and standardized as ISO 22241. DEF is an aqueous urea solution made with 32.5% high-purity urea (AUS 32) and 67.5% deionized water.

Voltage source 19 may be any available source, such as batteries, fuel cells, power from the grid, and renewable energy sources, such as a solar cell or a wind-turbine generator, for example. The voltage source 19 is in electrolytic communication with the first and second electrodes 13, 15, and provides a voltage difference sufficient to effect the desired electrochemical reaction on the substrate.

In accordance with an embodiment of the present invention, a method of making the the first electrode described above is provided. The method comprises preparing a graphene coating; and covering, at least partially, the active catalyst material with the graphene coating. As described above, the graphene coating may be prepared, for example, via CVD on a substrate, followed by dissolution of that substrate. For instance, the graphene film may be grown by CVD on copper foil, followed by dissolution of the copper foil in, for example, Marble's reagent or sulfuric acid. In an alternative embodiment, a graphene coating can also be directly grown on the active catalyst material.

Figure 2:
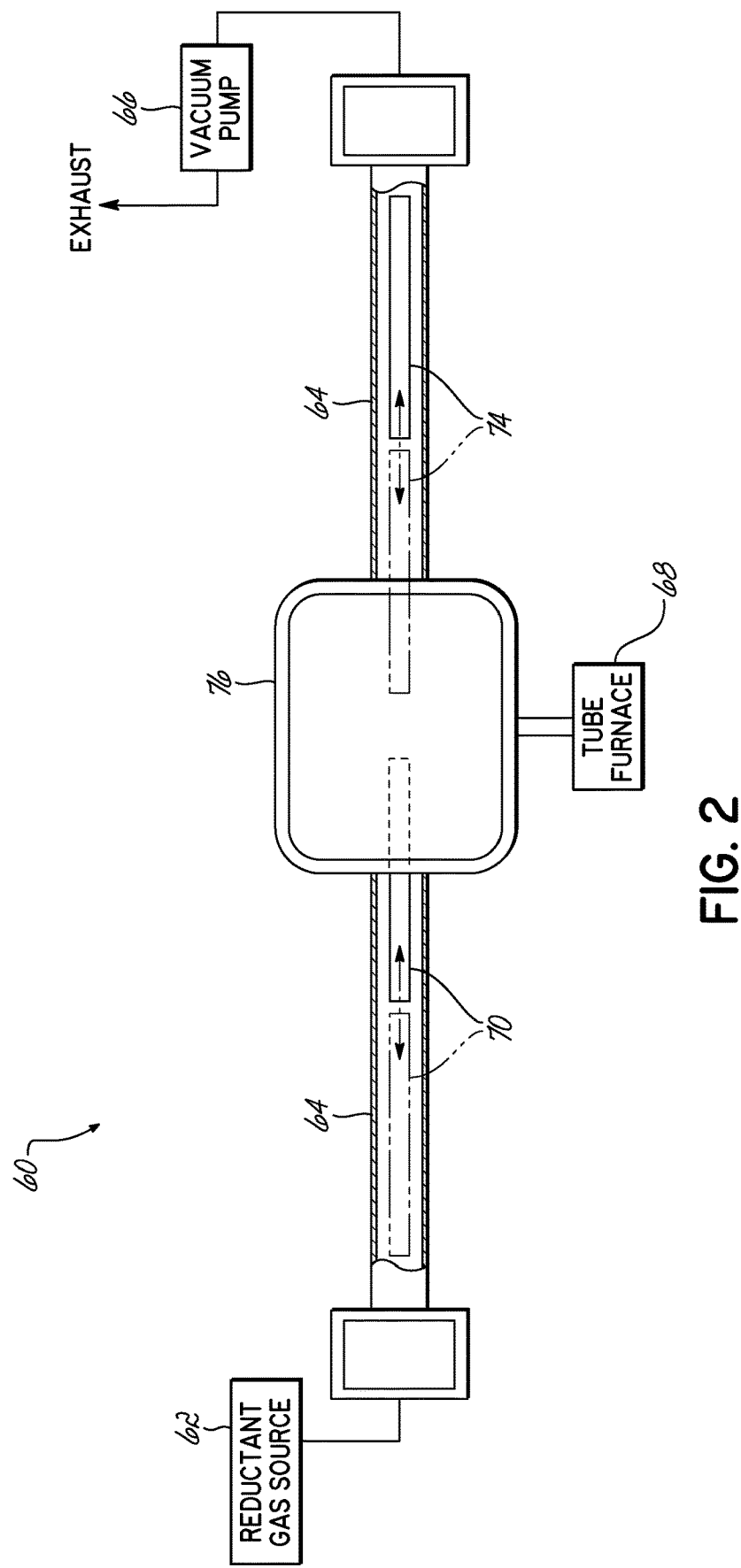
FIG. 2 is a diagrammatic depiction of an exemplary apparatus for growing a graphene film that is suitable for making a graphene coated electrode, in accordance with an embodiment of the present invention.

With reference to FIG. 2, a diagrammatic depiction of an apparatus 60 suitable for producing a graphene layer is provided. As shown, the apparatus 60 includes a reductant gas source 62, a quartz tube 64, and a vacuum pump 66. The reductant gas source 62 includes a reductant gas, as well as an inert carrier such as argon. Reductant gas is introduced into the quartz tube 64, which may be heated with a tube furnace 68, and then transported through the quartz tube 64 under reduced pressure provided by the vacuum pump 66. The quartz tube 64 contains a first substrate 70, such as a copper foil, which is coated with a layer of the electrolyzed coal product, and a second substrate 74 onto which the graphene layer will be produced. The second substrate 74 for supporting nanostructure graphene synthesis may be a copper foil, a silicon wafer, or any other material that can withstand reaction conditions.

To produce graphene, the first substrate 70 and the second substrate 74 are inserted into a heating zone 76 of the tube furnace 68. The graphene is then formed onto the second substrate 74 by flowing the reductant gas and carrier gas mixture over the first substrate 70 at elevated temperatures.

Higher temperatures facilitate the production of graphene. At lower temperatures, such as about 400° C., a carbon film is produced that is not graphene. Accordingly, it is preferred to use higher temperatures, at least 490° C. or higher, up to about 1100° C. Higher temperatures, such as 700° C. to 1000° C. can also be used, and, typically, 800° C. to 1000° C. will be utilized. These temperatures cause graphite production in the presence of the reductant gas. A flowing stream of reductant gas deposits graphene onto the uncoated substrate 74.

Figure 3:
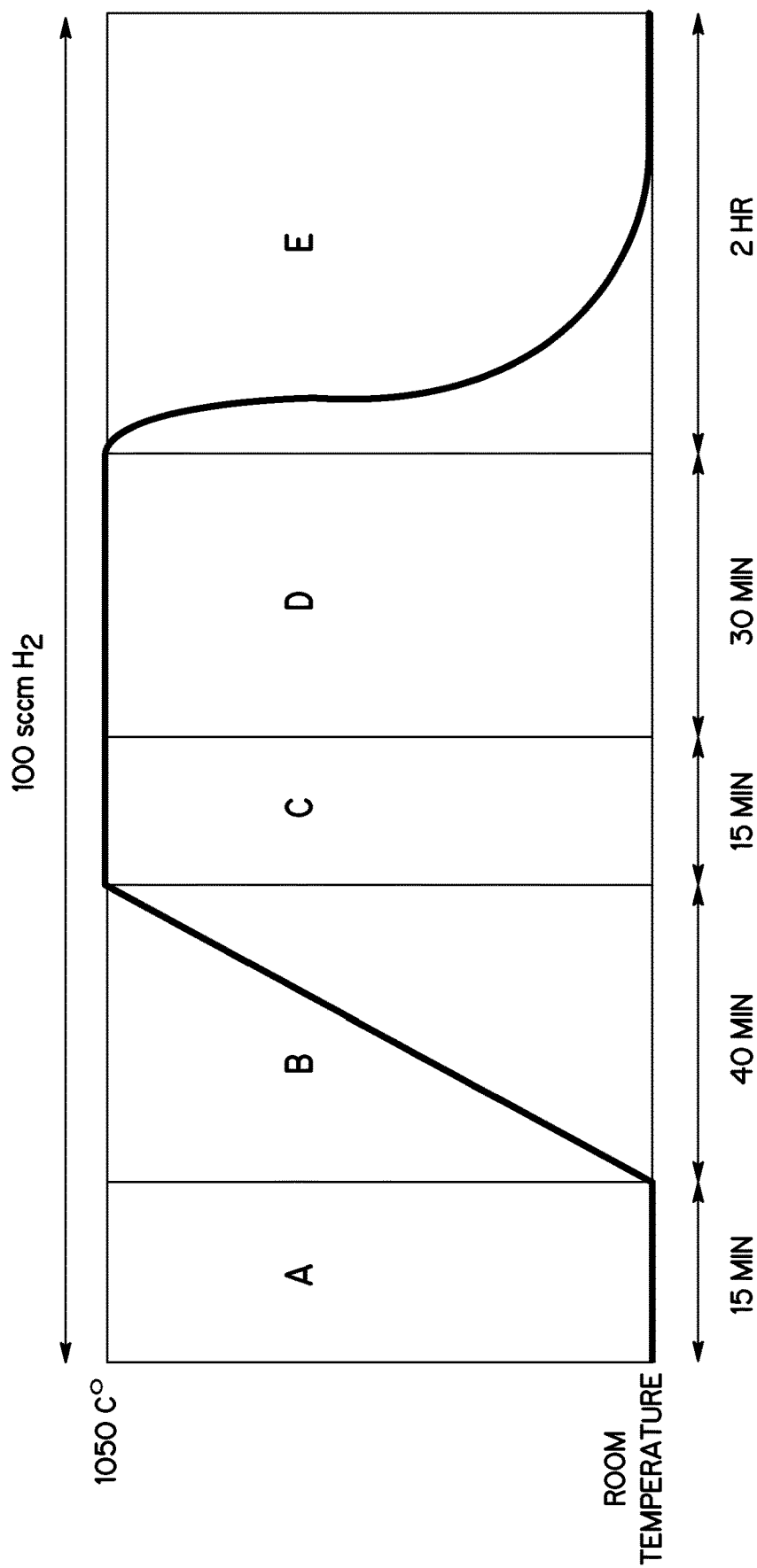
FIG. 3 is a schematic showing a graphene synthesis procedure, which utilizes the apparatus shown in FIG. 2, in accordance with an embodiment of the present invention.

An exemplary thermal program used for prepare the graphene layer is shown in FIG. 3. In zone A, the quartz tube 64 is evacuated to about 100 mtorr and purged with about 100 sccm hydrogen. In zone B, the heating zone 76 of the quartz tube 64 is ramped to about 1050° C. over about 40 minutes. In zone C, the second substrate 74, which may be copper, is annealed in the heating zone 76 for about fifteen minutes. In zone D, the first substrate 70 is moved into the heat zone 76 to initiate graphene synthesis. After synthesizing the graphene layer on the second substrate 74 for the desired length of time (e.g., about 30 min), the second substrate 74 is removed from the heating zone 76, and the apparatus 60 is allowed to cool to room temperature, as represented in zone E.

The graphene layer may then be lifted from the second substrate 74 by dissolving the second substrate material in an appropriate reagent solution. For example, copper dissolves in strong acids such as hydrochloric acid. Accordingly, the copper foil with the graphene layer may be dissolved using Marbles Reagent, thereby lifting the graphene layer from the second substrate 74 to provide a free layer of graphene. After appropriate washings, the free layer of graphene may be applied or lifted to the active catalyst material 25 to provide the graphene coating 27 to the first electrode 13.

Coating the active catalyst material 25 with the graphene coating 27 can be effected by immersing the active catalyst material 25 in a vessel containing graphene film floating in water. Upon lifting the active catalyst material 25 out of the vessel, the graphene film adheres to the active catalyst material 25. In an embodiment of the invention, the active catalyst material 25 may be roughened, by sandblasting for example, prior to coating with the graphene film to encourage adhesion between the graphene coating 27 and the active catalyst material 25.

In accordance with another embodiment of the present invention, a method of performing an electrochemical reaction with the electrochemical cell described above is provided. The method comprises contacting the first electrode and the second electrode with the chemical substance, in the presence of the electrolyte; and applying a voltage difference between the first and second electrodes effective to carry out the electrochemical reaction. As described above, the chemical substance is not particularly limited. In one embodiment, the chemical substance may be an alcohol. In another embodiment, the chemical substance is urea, which undergoes electrolytic hydrolysis to produce ammonia.

The present invention will be further appreciated in view of the following examples.

EXAMPLES

Chemicals and Reagents:
The chemicals and supplies used were of high purity (>99.90%) and analytical grade supplied from FISHER SCIENTIFIC. Ultra-pure water (ALFA AESAR, HPLC grade) was used throughout the investigation.

Synthesis of Graphene Film:
Graphene film was synthesized via traditional CVD technique using sub-bituminous Wyodak coal, as demonstrated by Vijapur et al., "Raw Coal Derived Large Area and Transparent Graphene Films," 2 ECS Solid State Letters M45-M47 (2013), which is incorporated by reference herein in its entirety. FIG. 2 shows an apparatus 60 and FIG. 3 shows a schematic for a graphene synthesis procedure, in accordance with an embodiment of the present invention, in which graphene is grown on copper foil. Briefly, the graphene synthesis system, which contains a quartz boat with electrolyzed coal and a quartz boat with copper support, was evacuated to 100 millitorr and then purged with 100 sccm hydrogen. The quartz boat with the electrolyzed coal was heated in the heat zone of the graphene synthesis system using a furnace ramp to 1050° C. over 40 minutes with 600 sccm argon and 100 sccm hydrogen flow. The 1050° C. temperature was maintained for 30 minutes, during which time graphene growth on the copper support occurred. The graphene-coated copper support was moved out of the furnace while maintaining the argon-hydrogen flow, thereby cooling the graphene-coated copper support under a rapid cool down, fully cooling to room temperature over a period of 3 hours.

The copper substrate was dissolved in sulfuric acid or Marble's Reagent, leaving the graphene film floating in the reagent. A clean microscopic glass slide was used to transfer the film from the reagent to deionized water. The film was additionally transferred to deionized water twice more to remove any contamination and clean the surface of the graphene film. The graphene thus prepared was 3 to 5 layers thick and is capable of being lifted onto any surface, including that of an electrode, a support material, and/or active catalyst material.

Preparation of Graphene on Nickel and Bare Nickel Disk Working Electrodes:
The electrochemical measurements were performed on a rotating nickel disk (Ni disk, 0.2 $cm^2$, ALFA AESAR, 99.98%) and multi layer graphene transferred on nickel disk (Ni-Gr) as working electrodes. The surface of the Ni disk was roughened using a sandblaster (Crystal Mark sandblaster, 27.5 micron aluminum oxide powder) under dry conditions at 60 psi, followed by sonication (Zenith Ultrasonic bath at 40 kHz) in a solution containing a 1:1 ratio of water and acetone, for 10 minutes. The bare Ni disk electrode thus prepared was rinsed with ultra pure water and mounted on a TEFLON shaft with an exposed surface area of 0.0706 $cm^2$. The bare Ni disk was used as the control electrode for the electrochemical analyses.

After the electrochemical measurements using the bare Ni disk electrode, the Ni disk was rinsed thoroughly with deionized water and acetone, and dried by a flow of argon. The TEFLON shaft with Ni disk was then immersed in a deionized water-filled petri dish containing the floating graphene film. The graphene film was directly lifted on the Ni disk mounted on the TEFLON shaft. The electrode was further dried in an oven at 70° C. for 1 hour. The Ni-Gr electrode thus prepared was used further in the electrochemical measurements.

Preparation of Nickel Plated Glassy Electrode:

In an alternate set of experiments, a nickel plated glassy electrode was used. Briefly, nickel was deposited on a glassy carbon substrate using a Watt's bath (280 g/L $NiSO_4.6H_2O$, 40 g/L $NiCl_2.6H_2O$, and 30 g/L $H_3BO_4$) at −0.8 volts versus Ag/AgCl reference electrode at 45° C. to load 0.5 mg/cm² nickel on the glassy carbon substrate over a duration of 300 seconds, which provided the nickel plated glassy electrode. The nickel plated glassy electrode was coated with graphene in a manner analogous to the coating of the Ni-Gr disk to provide the graphene-coated nickel plated glassy electrode.

Electrochemical Testing:

The electrochemical tests were carried out in a conventional three-electrode cell using a Solartron 1281 multiplexer potentiostat. The cell setup consists of bare Ni disk, Ni-Gr disk, nickel plated glassy electrode, or graphene-coated nickel plated glassy electrode, as working electrodes, Pt foil (2×2 cm² Sigma Aldrich, 0.05 mm thick, 99.99%) counter electrode, and Hg/HgO reference electrode supported in a luggin capillary filled with the electrolyte solution used in the respective experiment. The tenth pseudo-steady state voltammogram, sustained periodic state was reported.

Figure 4A:
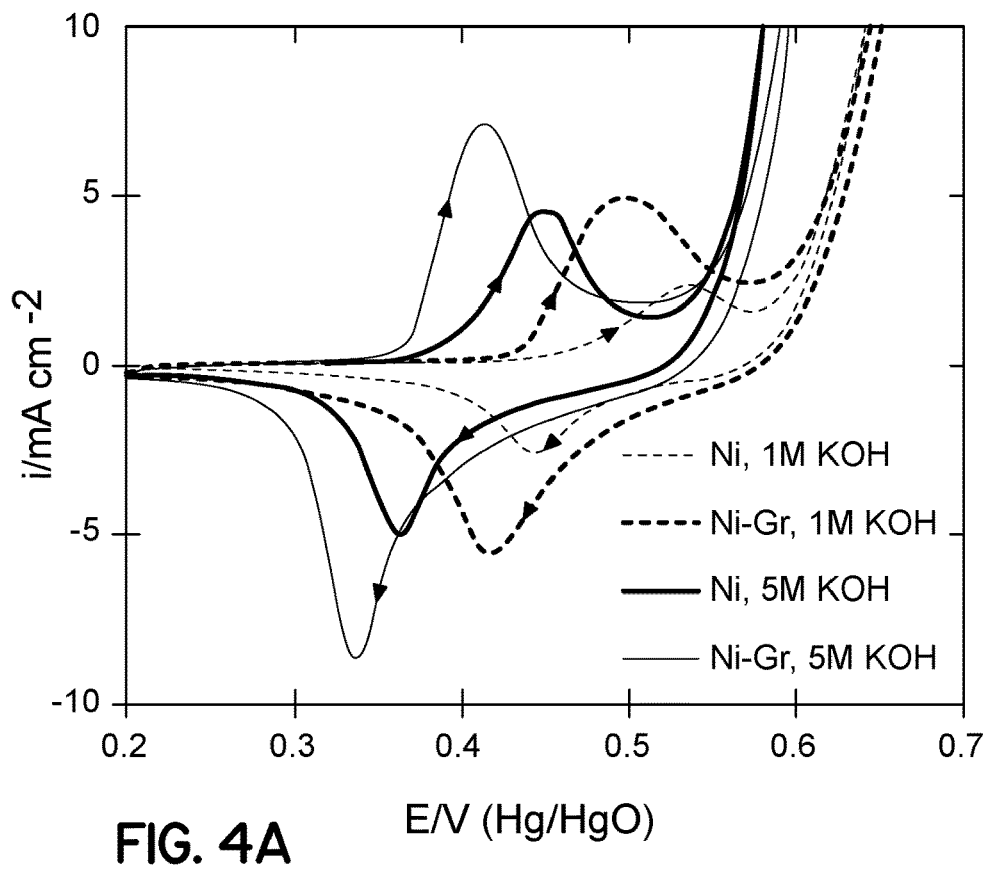
FIG. 4A shows the voltammogram of Ni-Gr and Ni disk electrodes obtained in 1 M and 5 M KOH solution.

Results Using Bare Ni Disk and Ni-Gr Disk for Urea Electrolysis and the Oxidation of Methanol:

FIG. 4A shows the voltammogram of Ni-Gr and Ni disk electrodes obtained in 1 M and 5 M KOH solution. The voltammogram collected in 5 M KOH solution, for both Ni-Gr and Ni disk electrodes illustrates an anodic and cathodic peak in the forward and reverse scan, respectively. Similar behavior is noticed for 1 M KOH solution. The anodic peak is due to the oxidation of $Ni(OH)_2$ to NiOOH, whereas the cathodic peak is due to the reduction of NiOOH to $Ni(OH)_2$, as per the following reaction.

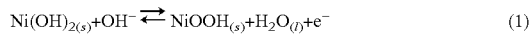

$$Ni(OH)_{2(s)} + OH^- \rightleftarrows NiOOH_{(s)} + H_2O_{(l)} + e^- \quad (1)$$

The voltammogram obtained using Ni-Gr electrode in 1 M KOH and 5 M KOH solution shows a negative shift in the slope of the NiOOH peak when compared with the bare Ni disk electrode. Without intending to be bound by any theory, it is believed that the negative shift is due to the increase in local pH at the electrode-electrolyte interface due to the strong affinity of $OH^-$ ions to the graphene surface. Also, the anodic peak current for Ni-Gr electrode is higher than that of the bare Ni electrode for both 1 M KOH and 5 M KOH solution. The formation of NiOOH is a pH dependent process and hence the local improvement in pH at the electrode-electrolyte interface will lead to the increase in the NiOOH species formation. It is believed that CVD grown few layer graphene sheets have nanopores that allow the selective passage of $OH^-$ ions to the Ni surface, leading to an increased ionic conductance at the electrode-electrolyte interface. In turn, the diffuse layer thickness of the electric double layer (EDL) decreases due to the high accumulation of OFF ions at the interface. Also, the onset potential of NiOOH formation decreases to more negative values with the Ni-Gr electrode than the bare Ni electrode, indirectly verifying the increased pH at the electrode-electrolyte interface.

Figure 4B:
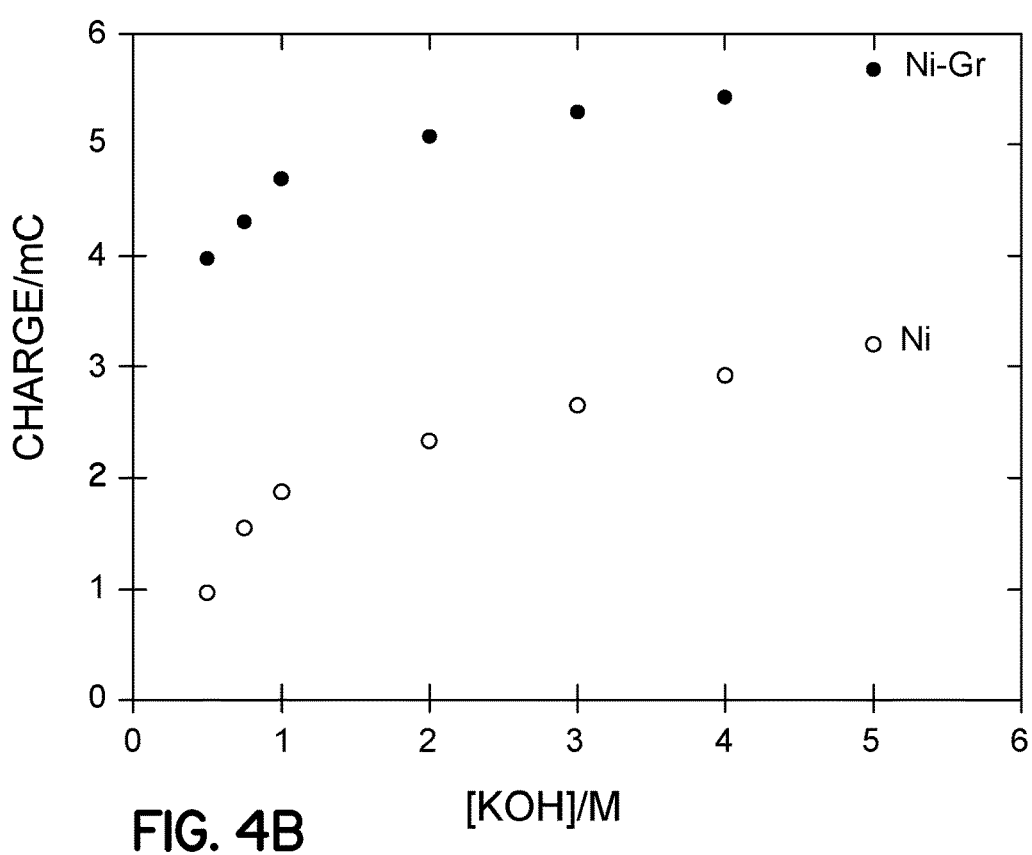
FIG. 4B shows the variation in the charge associated with the anodic NiOOH peak with various concentrations of KOH using the Ni-Gr and Ni disk electrodes.

The variation in the charge associated with the anodic NiOOH peak with various concentrations of KOH solution is reported in FIG. 4B. The NiOOH charge is calculated by integrating the area under the respective NiOOH peaks. The Ni-Gr electrode shows an average 55% increase in the NiOOH charge relative to the bare Ni disk electrode, suggesting an excess formation of NiOOH species when a graphene layer is lifted onto the bare Ni disk electrode.

Figure 4C:
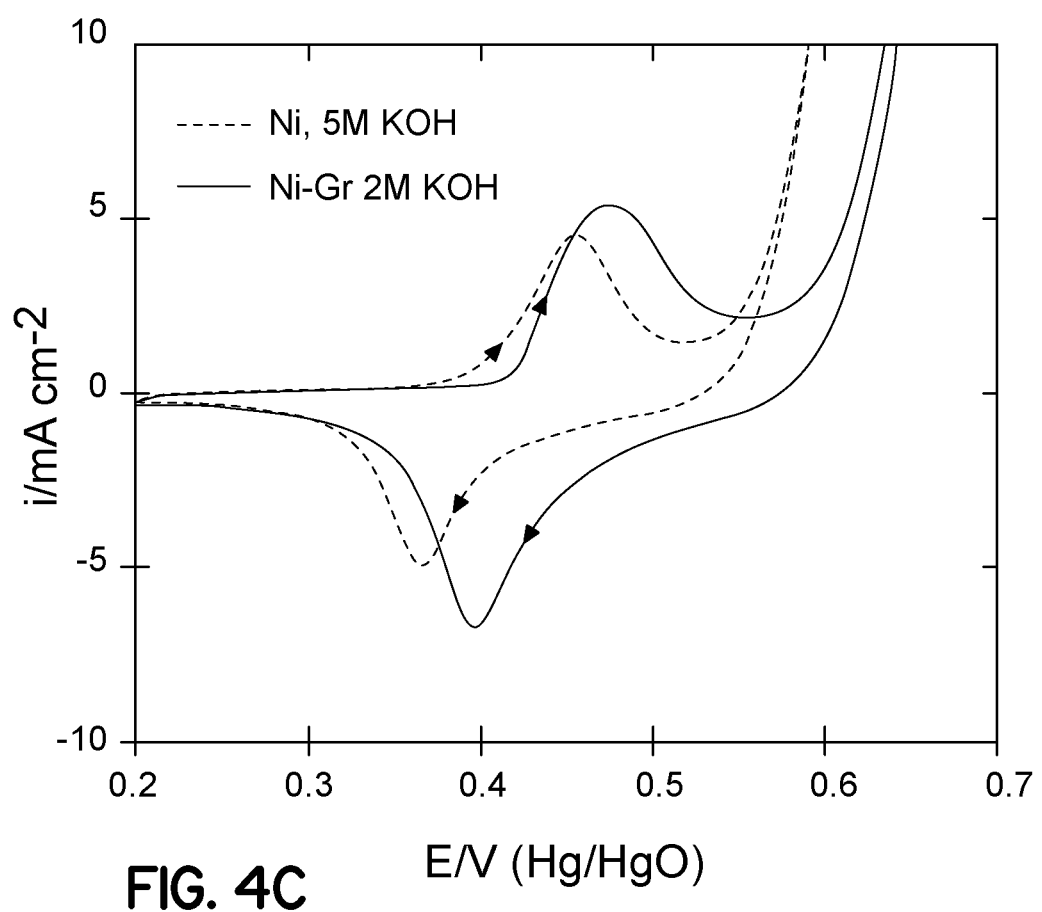
FIG. 4C shows a comparison of the voltammogram of Ni-Gr and bare Ni disk electrodes obtained in 2 M KOH and 5 M KOH solution.

The voltammogram of Ni-Gr and bare Ni disk electrodes obtained in 2 M KOH and 5 M KOH solution, respectively, is compared in FIG. 4C. The anodic peak current ($i_{pa}$) for NiOOH obtained on the Ni-Gr electrode in 2 M KOH solution is higher than that of the bare Ni disk electrode in 5 M KOH solution. The Ni-Gr electrode displays a 37% increase in the anodic charge related to NiOOH formation relative to the bare Ni disk electrode. This result suggests that the Ni-Gr electrode can efficiently oxidize $Ni(OH)_2$ to NiOOH even at a low concentration of KOH (2 M KOH).

Figure 5A:
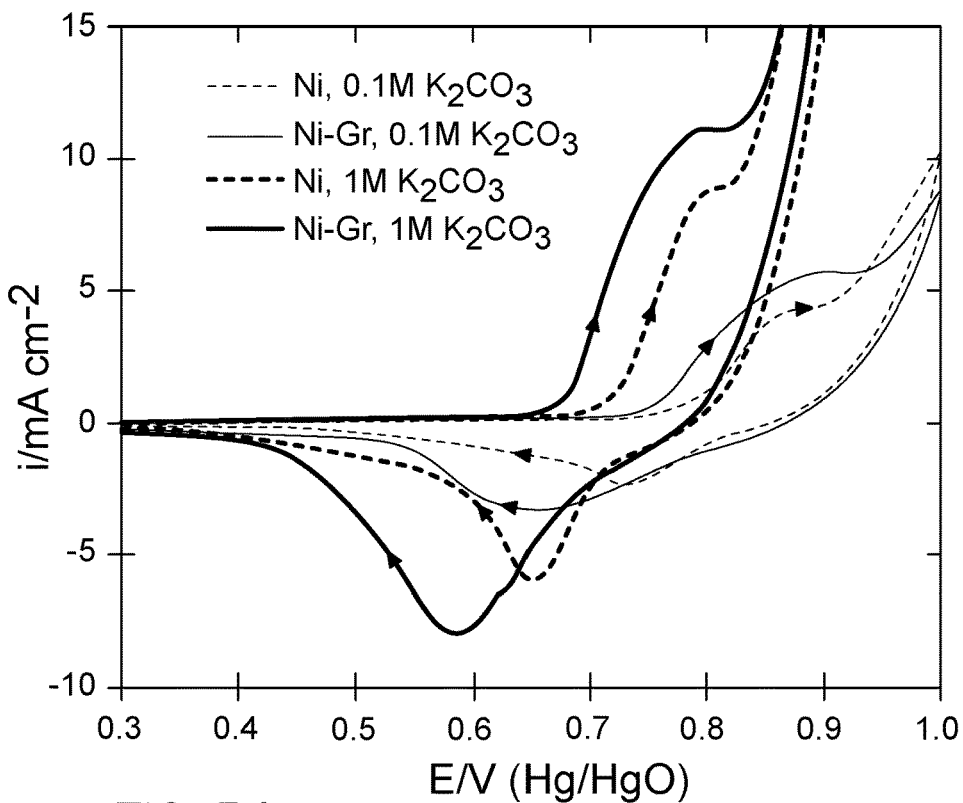
FIG. 5A shows the cyclic voltammogram of Ni-Gr and Ni disk electrodes obtained in 0.1 M and 1 M $K_2CO_3$.

To further verify the ability of graphene layer to adsorb $OH^-$ ions and modify the diffuse layer in the EDL, similar experiments were performed in $K_2CO_3$ electrolyte, which is less alkaline than KOH. The cyclic voltammogram of Ni-Gr and Ni disk electrodes obtained in 0.1 M and 1 M $K_2CO_3$ is shown in FIG. 5A. The onset potential of the NiOOH formation reaction on Ni-Gr is more negative than that of the bare Ni disk electrode for both 0.1 M and 1 M $K_2CO_3$ solutions. Also, the charge under the anodic peak (NiOOH formation) for Ni-Gr electrode is higher than that of the bare Ni disk electrode. Without intending to be bound by any theory, it is believed that the observed voltammogram suggests that the graphene layer accounts for the increased local pH change at the electrode-electrolyte interface leading to the augmented NiOOH formation. As previously discussed, it is also believed that the nanopores of the graphene sheets account for the selective passage of $OH^-$ ions, which leads to an increased local pH change at the EDL.

Figure 5B:
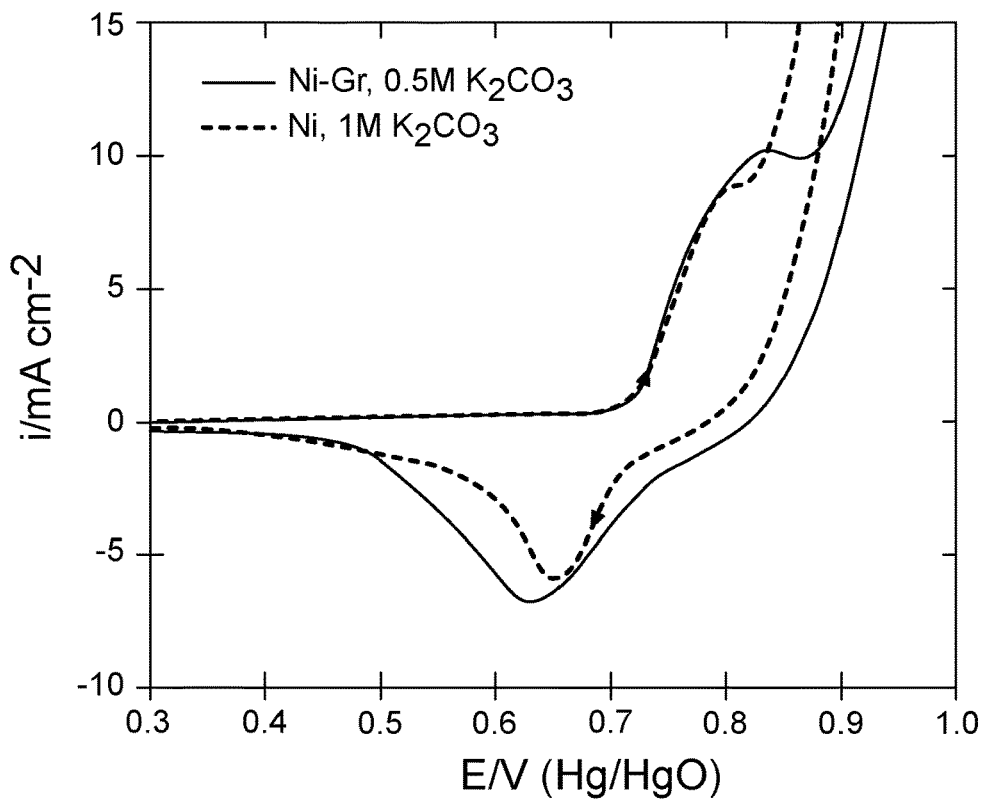
FIG. 5B shows the voltammogram obtained on Ni disk and Ni-Gr electrodes in 1 M and 0.5 M $K_2CO_3$ solution, respectively.

FIG. 5B shows the voltammogram obtained on Ni disk and Ni-Gr electrodes in 1 M and 0.5 M $K_2CO_3$ solution, respectively. The voltammogram suggests that the Ni-Gr electrode with 0.5 M $K_2CO_3$ gives comparable NiOOH formation to the bare Ni disk electrode in 1 M $K_2CO_3$.

Figure 6A:
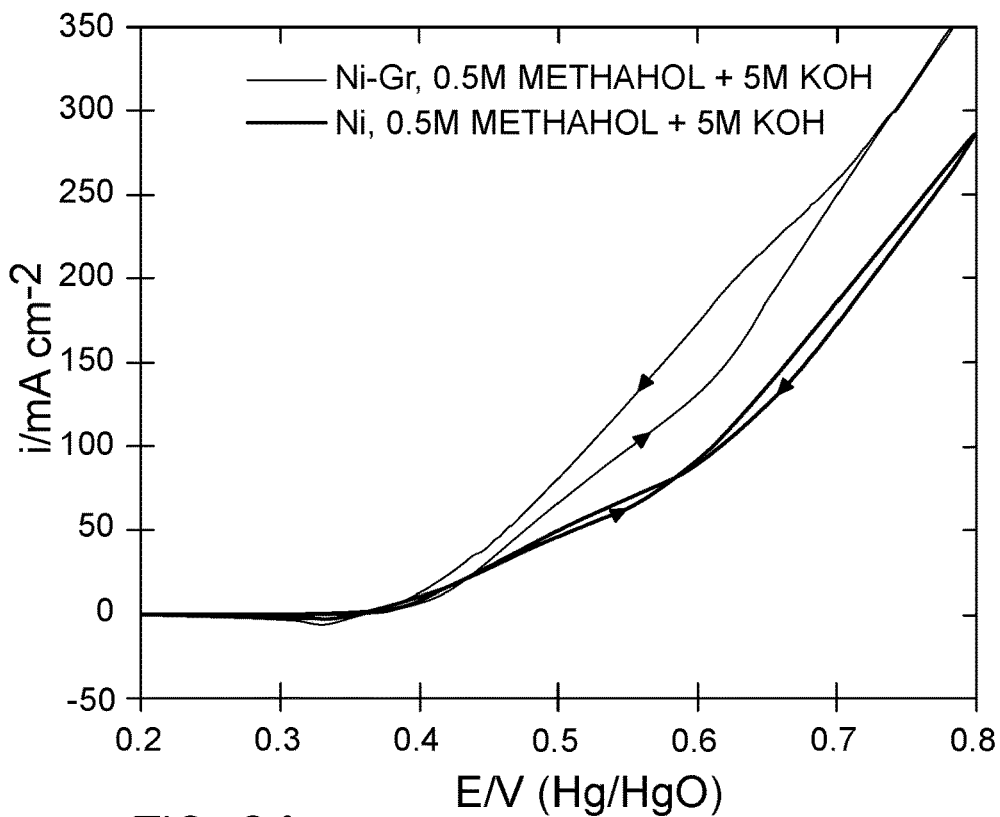
FIG. 6A shows the voltammogram obtained on Ni disk and Ni-Gr electrodes in 0.5 M methanol in a 5 M KOH solution.
Figure 6B:
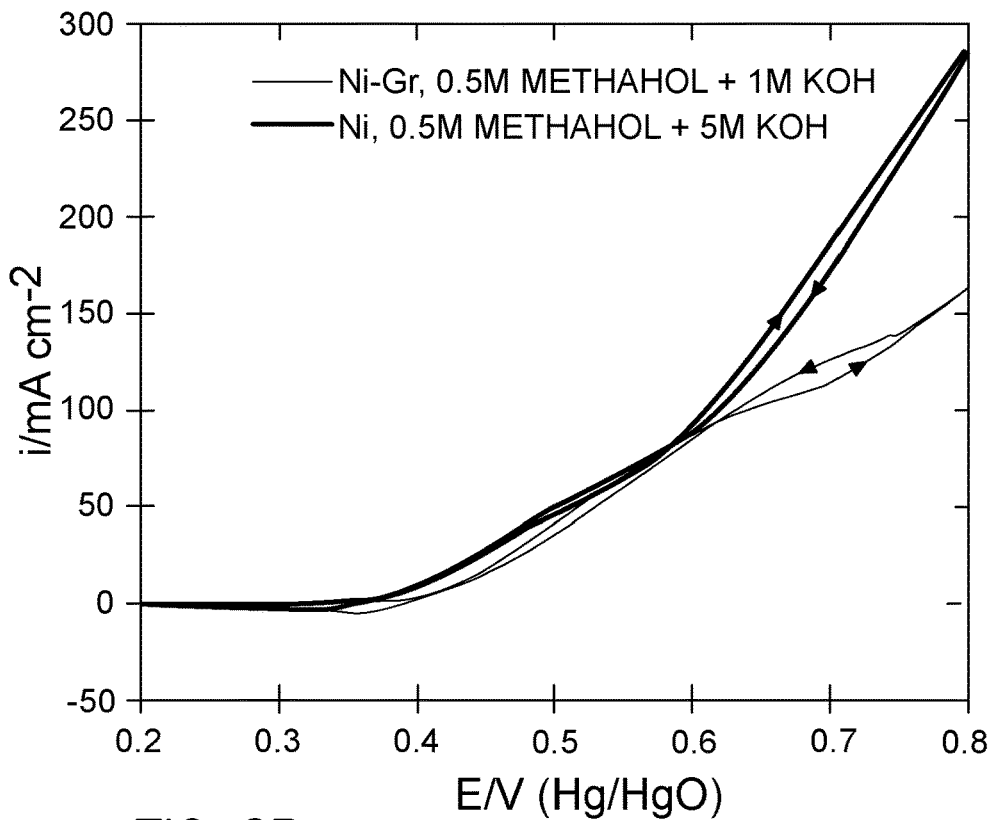
FIG. 6B shows the voltammogram obtained on Ni disk and Ni-Gr electrodes in 0.5 M methanol in a 2 M KOH solution.

Similar electrochemical analyses were performed for the oxidation of methanol on Ni disk and Ni-Gr electrodes in alkaline medium. The results are presented in FIGS. 6A and 6B. The cyclic voltammogram (FIG. 6A) shows that the Ni-Gr electrode exhibits high electrocatalytic activity towards the oxidation of 0.5 M methanol in 5 M KOH solution. FIG. 6B suggests that the Ni-Gr electrode demonstrates higher peak current (111 mA) for the electrochemical oxidation of 0.5 M methanol in 2 M KOH solution compared to the bare Ni disk electrode (60 mA). Thus, methanol oxidation is favoured at low pH in the presence of an electrode comprising graphene on Ni.

Figure 7:
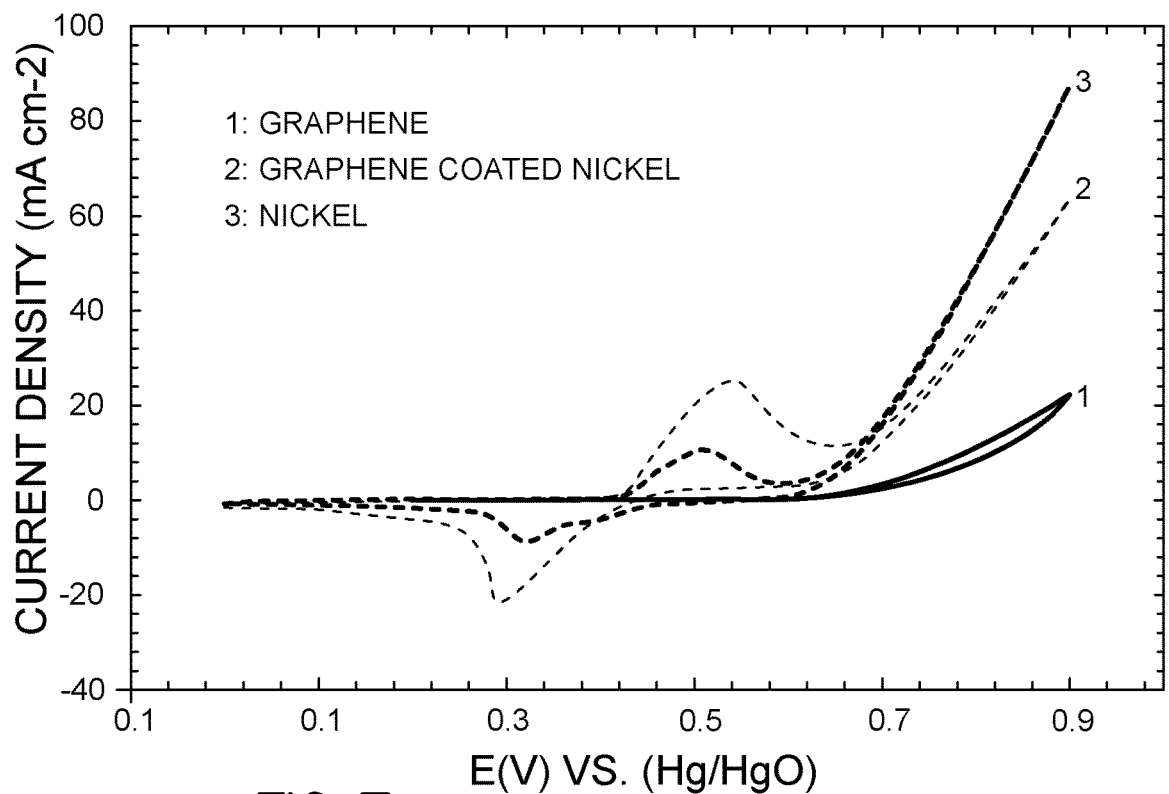
FIG. 7 shows a comparison of cyclic voltammetry results in a 5M KOH solution using: (1) a graphene-coated glassy electrode (without nickel); (2) a graphene-coated nickel plated glassy electrode; and (3) a nickel plated glassy electrode (without graphene).

Results Using Nickel Plated Glassy Electrode and Graphene-Coated Nickel Plated Glassy Electrode for Urea Electrolysis:

FIG. 7 shows a comparison of cyclic voltammetry results in a 5M KOH solution using: (1) a graphene-coated glassy electrode (without nickel); (2) a graphene-coated nickel plated glassy electrode; and (3) a nickel plated glassy electrode (without graphene). A pair of redox current peaks is observed, which corresponds to the reversible transformation between Ni(II) and Ni(III); the anodic peak is due to the oxidation of $Ni(OH)_2$ to NiOOH, whereas the cathodic peak is due to the reduction of NiOOH to $Ni(OH)_2$, as per the following reaction.

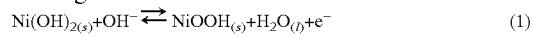

$$Ni(OH)_{2(s)} + OH^- \rightleftarrows NiOOH_{(s)} + H_2O_{(l)} + e^- \quad (1)$$

Higher area under the curve (charge) for the graphene-coated nickel plated glassy electrode corresponds to high re-generation of NiOOH, which is the active form of the catalyst.

Figure 8:
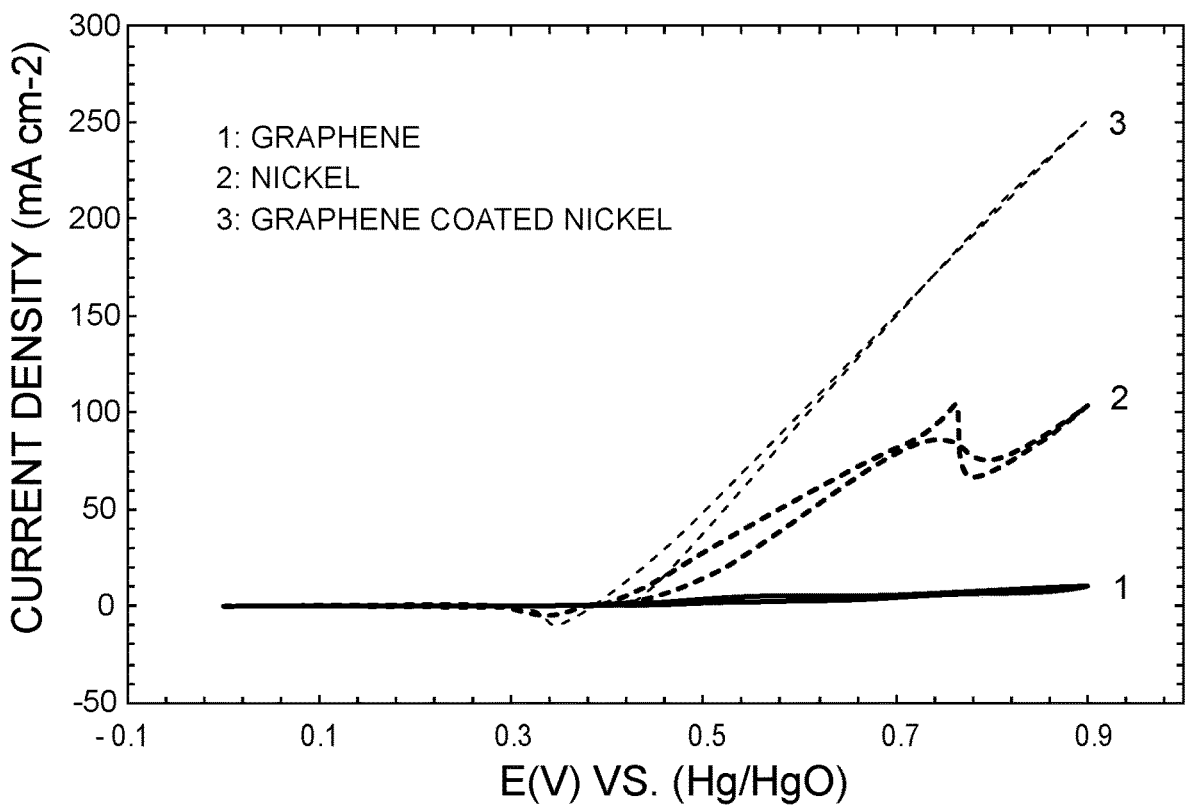
FIG. 8 shows a comparison of cyclic voltammetry results in a 0.5M urea and 5M KOH solution using: (1) a graphene coated glassy electrode (without nickel), (2) a nickel plated glassy electrode (without graphene), and (3) a graphene-coated nickel plated glassy electrode.

FIG. 8 shows a comparison of cyclic voltammetry results in a 0.5M urea and 5M KOH solution using: (1) a graphene coated glassy electrode (without nickel), (2) a nickel plated glassy electrode (without graphene), and (3) a graphene-coated nickel plated glassy electrode. A strong oxidation current starting at ca. 0.45 V was observed for both pure nickel plated glassy electrode and graphene-coated nickel plated glassy electrode when urea was present in the KOH solution. The oxidation of urea starts at the similar potential of the transition from $Ni^{2+}$ to $Ni^{3+}$, indicating that the $Ni^{3+}$ is the active form for catalyzing the urea electro-oxidation. Graphene alone is not active for the electro-oxidation of urea. The current density observed in the graphene-coated nickel plated electrode at 0.5 V vs. Hg/HgO is at least double the current density of the pure nickel plated glassy electrode at the same potential. The presence of graphene on the nickel enhanced the urea oxidation current and diminished the surface blockage peak around 0.7 V inherent to the pure nickel plated glassy electrode.

Figure 9:
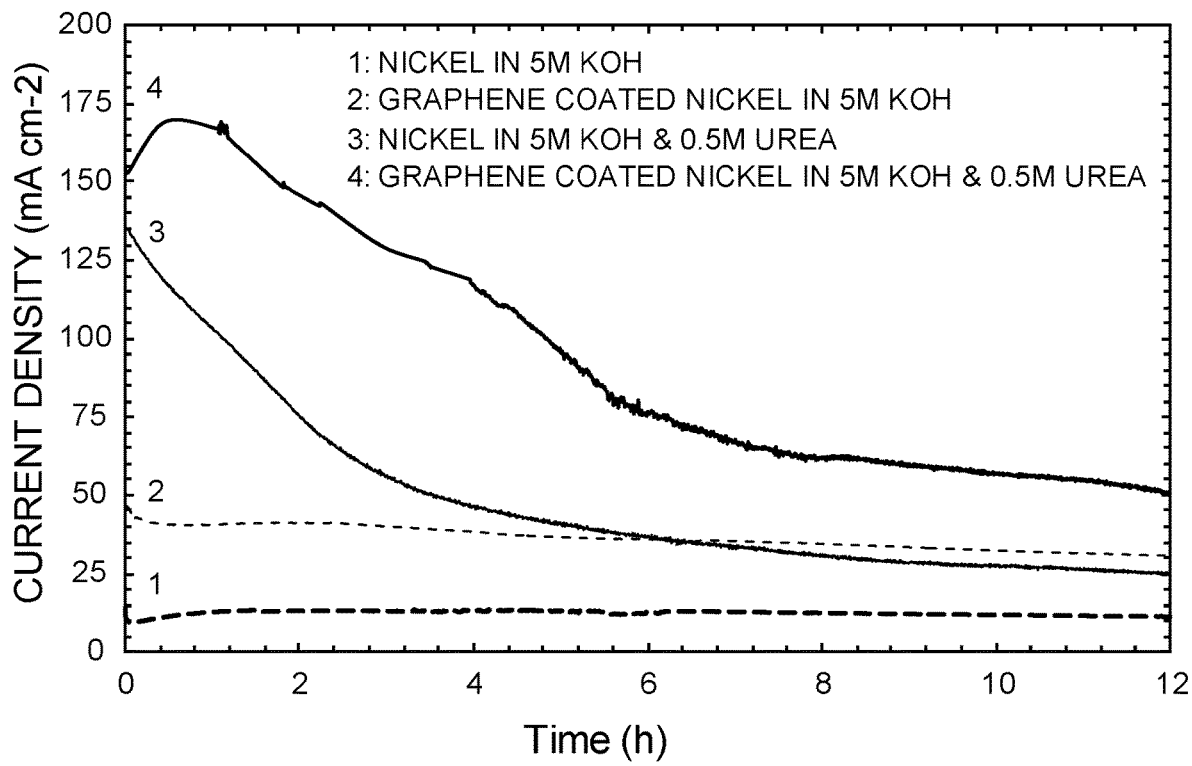
FIG. 9 shows a comparison of potentiostatic data collected using: (1) a nickel plated glassy electrode in 5M KOH; (2) a graphene-coated, nickel plated glassy electrode in 5M KOH; (3) a nickel plated glassy electrode in 5M KOH and 0.5M urea; and (4) a graphene-coated nickel plated glassy electrode in 5M KOH and 0.5M urea.

FIG. 9 shows a comparison of potentiostatic data collected using: (1) a nickel plated glassy electrode in 5M KOH; (2) a graphene-coated, nickel plated glassy electrode in 5M KOH; (3) a nickel plated glassy electrode in 5M KOH and 0.5M urea; and (4) a graphene-coated nickel plated glassy electrode in 5M KOH and 0.5M urea. The graphene-coated nickel plated glassy electrode (4) displays a relatively stable and higher current density, indicating a stable and active electrocatalyst. The current density when using the graphene-coated nickel plated glassy electrode (4) is more than twice that when using the nickel plated glassy electrode (3) without graphene, indicating an enhanced electrocatalytic oxidation of urea.

Figure 10:
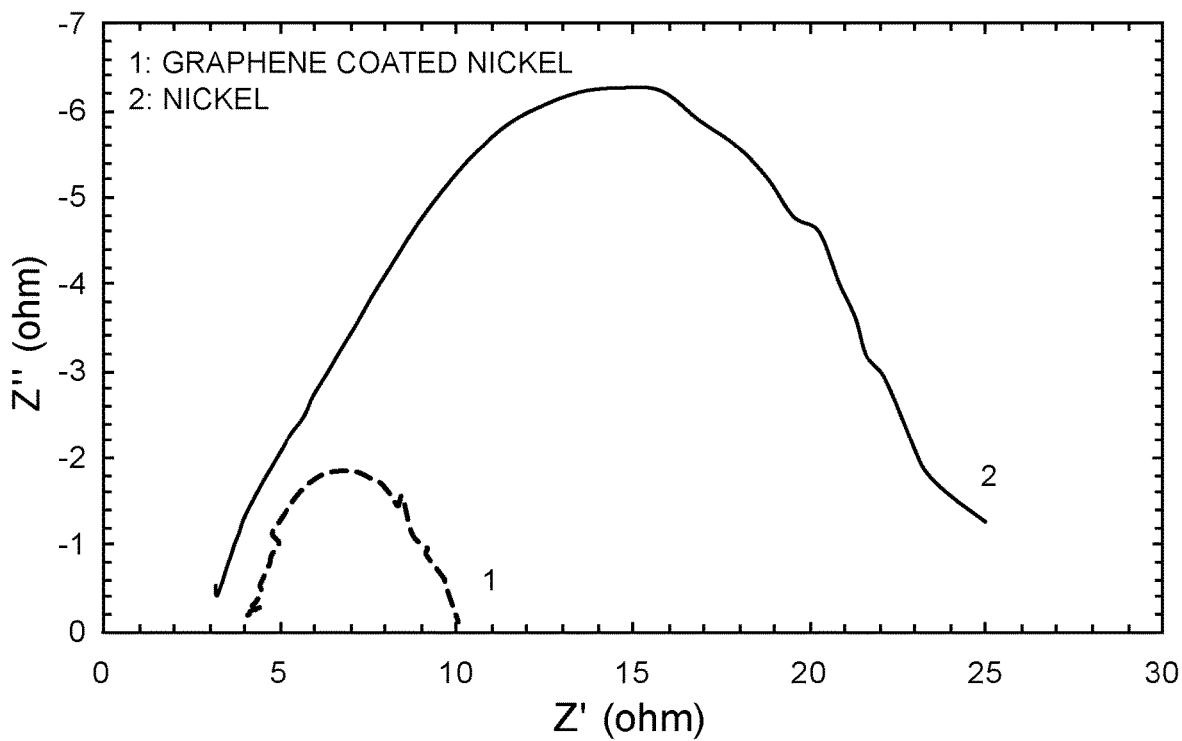
FIG. 10 shows the results of electrochemical impedance spectroscopy comparing: (1) a graphene-coated nickel plated glassy electrode; and (2) a nickel plated glassy electrode.

FIG. 10 shows the results of electrochemical impedance spectroscopy comparing: (1) a graphene-coated nickel plated glassy electrode; and (2) a nickel plated glassy electrode. Without intending to be bound by any theory, it is believed that the improved electrochemical performance by the graphene-coated nickel plated glassy electrode (1) results from the large active surface area of graphene films, which can promote the electron transfer of the urea oxidation, coupled with the synergistic contribution of nickel and graphene sheets. It is also believed that the graphene acts as a diffusion control layer which enhances the diffusion of $OH^-$ (in case of alkaline chemistry, increasing localized pH) and $H^+$ (in chase of acidic chemistry, decreasing localized pH). This increases the formation of the active catalyst which then enhances the chemical reaction. It is presumed that electrons flow through the graphene layer connected to the active catalyst, enhancing the chemical reaction. It is further believed that surface blockage on the surface of the active catalyst is prevented by the diffusion control layer caused by the graphene. For example, in urea electrolysis the graphene is believed to isolate $CO_2$ from the NiOOH, preventing surface blockage.

Corrosion Resistance During Ammonia Production Example

Diesel exhaust fluid (DEF, 32.5% high-purity urea (AUS 32) and 67.5% deionized water) 100 ml in the presence of 0.5 M $K_2CO_3$ was made and transferred to a 100 ml beaker. To maintain the volume of solution constant, DEF was periodically added to compensate for evaporation losses. Graphene coated nickel electrodes were fabricated as follow: 2 cm×2 cm graphene was lifted on a sandblasted Ni foil surface used for both cathode and anode for experiment. The portion of the Ni foil electrodes not covered by the graphene was masked with tape. During the electrolytic hydrolysis of urea to ammonia experiment, the solution was kept at 80° C., and the pH of the solution was measured as a function of time. A cell voltage of 1.55 V was applied to the cathode and anode, and the potential was switched every 2 seconds. Every 40 minutes, a 0.5 mL sample of the solution was taken, diluted to 100 ml, and analyzed for ammonia and nickel. The concentration of ammonia was measured using ammonia ion selective electrode. The ammonia evaporated from the beaker is not counted in the material balance. The concentration of Ni was measured using Atom Absorption Spectroscopy (AAS). After 4 hours experiment, the beaker was removed from heat source and cooled down to room temperature, then the pH value was measured. The four-hour electrolysis experiment was performed each day for 3 days. Comparative experiments utilized a graphene-coated Ni foil electrode, without sand-blasting surface preparation, and an uncoated nickel foil electrode.

Over the course of the three-day experiment, the pH of the reaction solution decreased from about 12 to about 10. For the non-sandblasted graphene coated Ni foil electrode, some delamination was observed with concomitant corrosion of the nickel catalyst under the relatively lower pH conditions. The sandblasted graphene coated Ni foil electrode maintained its integrity over the three-day experiment and the graphene coating provided protection against corrosion. Similarly, the nickel concentration measurements showed that about 4 times as much nickel dissolution occurred in the delaminated electrode.

Remarkably, in comparison to urea to ammonia experiment using a nickel foil electrode (DEF with 1 M $K_2CO_3$ at 70° C.), the graphene coated nickel foil electrode (DEF with 0.5 M $K_2CO_3$ at 80° C.) demonstrated a significantly higher rate of conversion of the urea to ammonia, for example, in the first hour the concentration of ammonia in the electrolyte is about 3 times higher in the graphene coated nickel electrode that in the nickel foil electrode.

While the present invention was illustrated by the description of one or more embodiments thereof, and while the embodiments have been described in considerable detail, they are not intended to restrict or in any way limit the scope of the appended claims to such detail. For example, the graphene-coated active catalyst materials may be used in many other applications, such as sensors, fuel cells, electrolyzers, batteries, capacitors, hydrolysis, etc. Additional advantages and modifications will readily appear to those skilled in the art. The invention in its broader aspects is therefore not limited to the specific details, representative product and method, and illustrative examples shown and described. Accordingly, departures may be made from such details without departing from the scope of the general inventive concept embraced by the following claims.

What is claimed is:

1. An electrochemical cell comprising:
    a first electrode comprising a layer of an active catalyst material, and graphene coating at least partially covering the layer of the active catalyst material;
    a second electrode comprising a conductor;
    an electrolyte medium in electrolytic communication with the first and second electrodes;
    a chemical substance capable of undergoing an electrochemical reaction; and
    a voltage source in electrolytic communication with the first and second electrodes.

2. The electrochemical cell of claim 1, wherein the first electrode further comprises a support material selected from the group consisting of platinum mesh, platinum foil, gold mesh, gold foil, tantalum mesh, tantalum foil, platinum sponge, iridium sponge, a carbon support integrated with a conductive metal, Ni foil, Ti foil, graphite, carbon fiber, carbon paper, glassy carbon, carbon nanofiber, and carbon nanotube.

3. The electrochemical cell of claim 1, wherein the active catalyst material comprises a member selected from the group consisting of platinum, iridium, rhodium, rubidium, ruthenium, rhenium, palladium, gold, silver, nickel, iron, cobalt, copper, zinc, chromium, tantalum, gallium, cadmium, indium, thallium, tin, lead, bismuth, silver, mercury, niobium, vanadium, manganese, aluminum, arsenic, selenium, antimony, titanium, tungsten, Raney metal, carbon steel, stainless steel, graphite, and mixtures and alloys thereof.

4. The electrochemical cell of claim 1, wherein the graphene coating comprises a graphene film prepared by chemical vapor deposition of electrolyzed coal.

\* \* \* \* \*